United States Patent

Terada et al.

[11] Patent Number: 5,436,623
[45] Date of Patent: Jul. 25, 1995

[54] ROAD INFORMATION DISPLAYING METHOD

[75] Inventors: Toshiyuki Terada, Tokyo; Toru Tanabe, Machida, both of Japan

[73] Assignee: Stanley Electric Co., Ltd., Tokyo, Japan

[21] Appl. No.: 155,106

[22] Filed: Nov. 22, 1993

Related U.S. Application Data

[63] Continuation of Ser. No. 950,810, Sep. 24, 1992, abandoned.

[30] Foreign Application Priority Data

Oct. 2, 1991 [JP] Japan .................................. 3-280356

[51] Int. Cl.⁶ .............................................. G08G 1/123
[52] U.S. Cl. ...................................... 340/995; 340/990; 364/449
[58] Field of Search ............... 340/905, 988, 995, 990; 364/449; 73/178 R

[56] References Cited

U.S. PATENT DOCUMENTS

| | | | |
|---|---|---|---|
| 4,403,291 | 9/1983 | Von Tomkewitsch | 340/995 |
| 4,638,438 | 1/1987 | Endo et al. | 340/995 |
| 4,763,270 | 8/1988 | Itoh et al. | 340/995 |
| 4,782,447 | 11/1988 | Ueno et al. | 340/995 |
| 4,937,752 | 6/1990 | Nanba et al. | 340/990 |
| 4,939,662 | 7/1990 | Nimura et al. | 340/995 |
| 5,031,104 | 7/1991 | Ikeda et al. | 340/995 |
| 5,043,902 | 8/1991 | Yokoyama et al. | 340/995 |
| 5,121,099 | 6/1992 | Hegg et al. | 340/980 |
| 5,148,146 | 9/1992 | Murphy | 340/980 |
| 5,198,797 | 3/1993 | Daidoji | 340/980 |
| 5,214,425 | 5/1993 | Wreede | 340/980 |
| 5,343,399 | 8/1994 | Yokoyama et al. | 340/995 |
| 5,371,497 | 12/1994 | Nimura et al. | 340/995 |

FOREIGN PATENT DOCUMENTS

| | | | |
|---|---|---|---|
| 3806848 | 9/1989 | Germany | 340/990 |
| 0093617 | 4/1987 | Japan | 340/995 |

*Primary Examiner*—Brent Swarthout
*Attorney, Agent, or Firm*—Louis Weinstein

[57] ABSTRACT

A road information displaying method characterized in that detailed information can be obtained on an auxiliary indicator 1 without changing the scale of a main indicator 21 by setting a small auxiliary indicator 1 in an instrument panel 10 in addition to a main indicator 21 of a center console 20 and using a road information display method for displaying details of road information corresponding to the display of the main indicator 21 on the auxiliary indicator 1. Thus, operation is simplified because it is unnecessary to change the scale of the area being displayed and change of the direction of the driver's line of sight during driving is decreased because the auxiliary indicator 1 is set in the instrument panel 10, and safety is improved.

10 Claims, 2 Drawing Sheets

ROAD INFORMATION DISPLAYING METHOD

This is a continuation of application Ser. No. 07/950,810, filed Sep. 24, 1992, now abandoned.

BACKGROUND OF THE INVENTION

1. Field of the Invention

The present invention relates to a so-called navigation system mounted on a vehicle and allowing a driver to easily reach a destination even if the driver is unfamiliar with the route to the destination.

2. Background Art

FIG. 4 shows an existing road information displaying method of this type, in which, for example, a CRT (cathode ray tube) with a display screen the size of approx. 6″ or main indicator 21 formed with a liquid crystal is set on a center console 20 of a car to display road information on the main indicator 21 by using graphic and character information of a map and routes.

In this case, if the car is moving to its destination, a map with the scale of, for example, 1/200,000 covering a large area is selected to be displayed on the main indicator 21. As the car comes closer to the destination, a map with smaller scale is manually or automatically selected successively in order of 1/100,000, 1/50,000, 125,000, and 1/10,000 so that the destination can be confirmed on the map in detail and information is supplemented by displaying characters on a part of the screen according to necessity.

SUMMARY OF THE INVENTION

For the above-mentioned existing method, however, firstly, detailed information is hardly obtained from the screen and, for example, it is difficult to accurately specify the position of the road to branch when a map with a large scale is selected. When a map with a small scale is selected, it is difficult for the driver during driving to read the indicator through the screen because unnecessary roads are also displayed. In this case, the driver has to stop the car at a position close to the destination to make confirmation. This is troublesome for the driver.

Secondly, the main indicator 21 must be set at the center console 20 because of the restrictions due to its size. In this case, the driver's line of sight when reading the main indicator 21 is greatly different from his line of sight during driving. This makes driver's confirmation during driving difficult and causes problems in view of safety. These points are problems to be solved.

The present invention solves the above-mentioned existing problems by providing a road information displaying method and apparatus using a main indicator for displaying road information due to vehicular traffic, characterized in that a small auxiliary indicator is set in an instrument panel of a vehicle to display details of the road information corresponding to information of the display on the main indicator on the auxiliary indicator.

DETAILED DESCRIPTION OF THE PREFERRED EMBODIMENTS

The present invention is described below in detail by using an embodiment shown in the accompanying drawings.

For easy understanding, portions which are the same as those of the embodiment according to the prior art are provided with the same symbols and the description of some overlapped portions is omitted.

Figure 1:
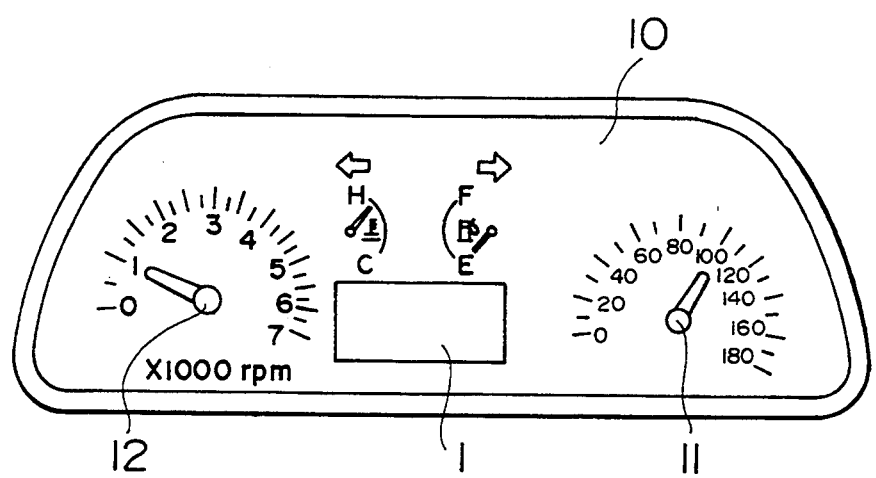
FIG. 1 is a front view of the constitution of an embodiment of the road information display method according to the present invention.

In FIG. 1, numeral 10 is an instrument panel of a vehicle. On the instrument panel 10, a speedometer 11, tachometer 12, etc. are arranged and all types of information necessary for driving of the vehicle are displayed in principle.

For the present invention, an auxiliary indicator 1 is set in the instrument panel 10. The auxiliary indicator 1 is formed as a dot matrix indicator using liquid crystal display elements, which displays details corresponding to the information displayed on the main indicator 21 (not illustrated) on the center console 20 as described in the embodiment according to the prior art.

Figure 2:
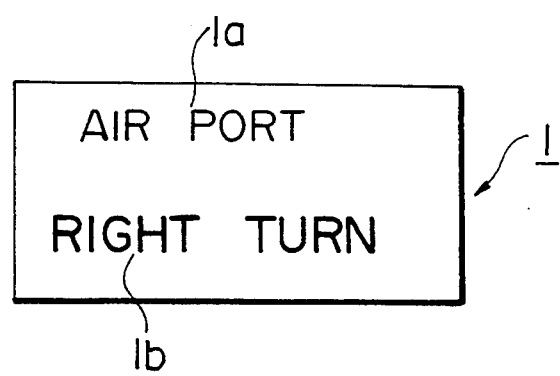
FIG. 2 is an illustration showing an example of the display on the auxiliary indicator of the same embodiment.

FIG. 2 shows an example of the display shown on the auxiliary indicator 1. A place name display section 1a and an action display section 1b, for example, are formed on the display section of the auxiliary indicator 1. On the place name display section 1a, the name of a place where an action should next be taken is displayed as an intersection name or the like. On the action display section 1b, the action which should be taken at the position of the place name is displayed as, for example, "turn right" or "right turn".

Actually, however, it may bother the driver to display information on the auxiliary indicator 1 too early. Therefore, it is preferable to display information on the auxiliary indicator 1 at a position 1 to 2 kilometers before the target place.

For example to make a right turn driving a car, in countries where cars drive on the left side of the road it is normal that a preparatory action such as previous securing of the central lane is necessary. Therefore, it is preferable to use an indicator capable of displaying a plurality of colors such as a color liquid crystal display for the auxiliary indicator and use a display method for initially displaying blue characters and then changing them to red characters at a distance of 500 m before the target place to notify the driver that he approaches the target place.

Figure 3:
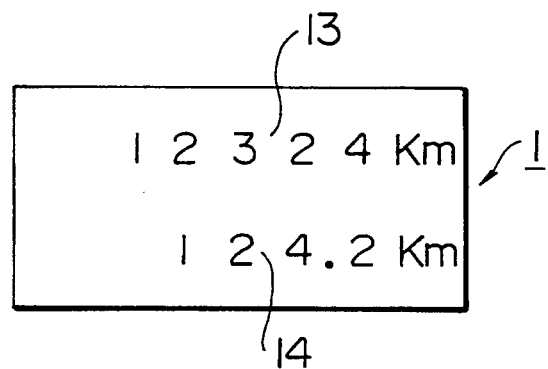
FIG. 3 is an illustration showing an example of the display on the auxiliary indicator of another embodiment of the present invention.
Figure 4:
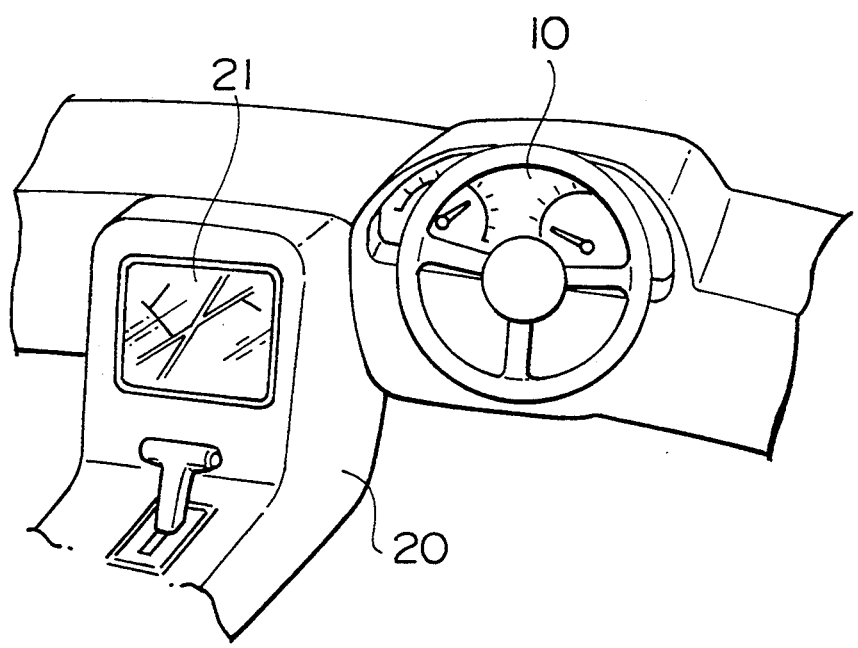
FIG. 4 is a perspective view of the constitution of an embodiment according to the prior art.

FIG. 3 shows another embodiment of the display method of the present invention, in which an integrating distance recorder and trip meter 14 are normally set on the instrument panel 10 in addition to the speedometer 11 and tachometer 12 and numerical values of 6 to 7 digits are displayed.

For this embodiment, the auxiliary indicator 1 is set at the position where the integrating distance recorder and trip meter should be set. In this case, the auxiliary indicator 1 uses the dot matrix type of display similar to the previous embodiment so that Japanese syllabarys, Chinese characters, and alphanumeric characters can be displayed.

When no navigation system is used for the auxiliary indicator 1 having the above constitution or no road information is displayed on the auxiliary indicator 1 though a navigation system is used, the integrating distance recorder 13 and the trip meter display numerical values of necessary number of digits as shown in FIG. 3. When display of information is necessary at the navigation system side, the auxiliary indicator 1 displays information on the place name display section 1a and action display section 1b similar to the case of the previous embodiment (see FIG. 2).

The following is the description of the function and advantage of the present invention realizing the above display method. Because the auxiliary indicator 1 according to the present invention is set and the display method for displaying details of information of the main indicator 21 on the auxiliary indicator 1 is used, necessary information can be obtained without changing the map on the main indicator 21 to a map with smaller scale even if detailed information is necessary at a high speed at a branch of an expressway and troublesome operation such as map change or map reading at high-speed traveling is unnecessary. This is also effective for a map with a small scale at low-speed traveling. For example, when town names and addresses of passing places are successively displayed, it is unnecessary to read the address of the destination by stopping the car.

Moreover, because the auxiliary indicator 1 is set in the instrument panel 10, the driver does not especially feel a sense of incompatibility because he only needs to slightly change the direction of his line of sight to read displayed detailed information during driving and the information to be read is displayed in the direction to which the driver's line of sight is normally changed to confirm the traveling speed.

The above embodiments are all described by using an example of displaying characters on the auxiliary indicator 1. However, it is also possible to display graphics showing the shape of an intersection, etc. and symbols including an arrow showing a route, or display characters, graphics, and symbols by properly combining them.

The objects to be displayed on the auxiliary indicator 1 in combination with road information are not restricted to the integrating distance previously mentioned. It is also possible to combine the object with a so-called warning display dealing with the vehicle such as "overheat".

As described above, firstly, the present invention allows rough information on areas to display with a main indicator and detailed information to display with an auxiliary indicator, eliminates a problem that detailed information is hardly read because it is displayed on the main indicator for branch during high-speed traveling, and greatly improves the availability of this type of navigation system by setting a small auxiliary indicator in an instrument panel of a vehicle and using a road information display method for displaying details of information corresponding to the display of the main indicator on the auxiliary indicator.

Secondly, the present invention shows an excellent effect for improvement of safety because a driver only needs to slightly change the direction of his line of sight to read detailed information in a short time during driving.

What is claimed is:

1. A road information displaying method using a main indicator located at a position displaced from a driver's line of sight when viewing a road ahead for displaying large-scale road information which changes responsive to vehicular travel, wherein a small auxiliary indicator is set in an instrument panel of a vehicle substantially closer to said line of sight and limited details of road information which correspond to the changing information displayed by the main indicator are displayed on the auxiliary indicator in a simplified fashion as compared with the more detailed information displayed on the main indicator;

said main indicator displaying a map having a large scale to thereby display a wide area being traveled;

said small auxiliary indicator displaying auxiliary map information including a graphical representation of an intersection representative of a portion of the map displayed by the main display unit;

wherein said auxiliary map information comprises graphics showing a shape of an intersection and a symbol indicating the desired direction of travel at the intersection.

2. A road information displaying method according to claim 1, wherein the auxiliary indicator normally operates as a display element of the instrument panel and road information is generated and displayed responsive to a switching of display information to generate and display information relating to distance travelled, distance to a destination or data relating to the vehicle when in a first switching state and for generating and displaying data relating to a vehicle action to be taken by a vehicle operator or to a significant landmark or street when in a second switching state.

3. A road information displaying method according to claim 1, wherein the auxiliary indicator changes display color of a generated display responsive to occurrence of given road information.

4. A road information display system for use in an automobile and incorporating an instrument panel positioned to minimize the deviation in an operator's eye movement to respectively view a road ahead and view the instrument panel, said system further comprising:

main display means a spaced distance from said instrument panel for presenting a map-like display of a relatively large scale for aid in reaching a destination shown in the main display means and which changes with changes in vehicle location; and auxiliary display means integrated into and forming part of said instrument panel including means for presenting auxiliary information of a simplified nature as compared with the map-like display and relating to only a specific location within an area displayed by said display means and related to changing information displayed by said main display means to aid in guiding an operator to a desired destination;

said main indicator comprising means for displaying a map having a large scale to thereby display a wide area being traveled;

said auxiliary indicator comprising means for displaying auxiliary map information including a graphical representation of an intersection representative of a portion of the map displayed by the main display unit;

wherein said auxiliary map information comprises graphics showing a shape of an intersection and a symbol indicating the desired direction of travel at the intersection.

5. The display system of claim 4 wherein said auxiliary display means includes means for presenting a first display portion comprised of a word or words representing an approaching landmark shown by the main display means and further means for presenting a word or words representing a vehicular maneuver to be performed in the vicinity of said landmark.

6. The system of claim 4 wherein said auxiliary display means further comprises means for displaying at least one of accumulated mileage representative of a distance travelled by the vehicle and means for generating and presenting a display representative of an expected distance to be travelled to reach a predetermined destination when in a predetermined normal state.

7. The system of claim 4 wherein said auxiliary display means includes means for generating and presenting display information of a first color when said vehicle is greater than a predetermined distance from a given destination and for changing the first color of said display information when said vehicle is less than said predetermined distance from said given destination.

8. A method according to claim 3 wherein, a color change of the generated display occurs responsive to the vehicle being equal to or less than a predetermined distance from predetermined displayed landmarks.

9. A road information displaying method according to claim 2 wherein different generated displays are displayed in a common display region at different time intervals thereby reducing the required display area.

10. A road information displaying system according to claim 6 wherein different generated displays are displayed in a common display region at different time intervals thereby reducing the required display area.

* * * * *